US009986207B2

(12) United States Patent
Cronin

(10) Patent No.: US 9,986,207 B2
(45) Date of Patent: *May 29, 2018

(54) REAL TIME VIRTUAL REALITY LEVERAGING WEB CAMS AND IP CAMS AND WEB CAM AND IP CAM NETWORKS

(71) Applicant: SONY INTERACTIVE ENTERTAINMENT AMERICA LLC, San Mateo, CA (US)

(72) Inventor: John Cronin, Williston, VT (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/377,288

(22) Filed: Dec. 13, 2016

(65) Prior Publication Data

US 2017/0150103 A1 May 25, 2017

Related U.S. Application Data

(63) Continuation of application No. 14/460,281, filed on Aug. 14, 2014, now Pat. No. 9,521,368, which is a
(Continued)

(51) Int. Cl.
*H04N 7/15* (2006.01)
*H04N 7/18* (2006.01)
*H04L 29/06* (2006.01)

(52) U.S. Cl.
CPC .......... *H04N 7/157* (2013.01); *H04L 65/403* (2013.01); *H04L 67/38* (2013.01); *H04N 7/183* (2013.01)

(58) Field of Classification Search
CPC .......... H04N 7/157; H04N 7/15; H04N 7/183; H04L 67/38; G06F 17/30; A63F 2300/9082
(Continued)

(56) References Cited

U.S. PATENT DOCUMENTS

| 5,258,785 A | 11/1993 | Dawkins |
| 5,585,871 A | 12/1996 | Linden |

(Continued)

FOREIGN PATENT DOCUMENTS

| EP | 1 679 577 | 7/2006 |
| EP | 2 378 781 | 10/2011 |

(Continued)

OTHER PUBLICATIONS

U.S. Appl. No. 15/239,382 Office Action dated Mar. 9, 2017.
(Continued)

*Primary Examiner* — Melur Ramakrishnaiah
(74) *Attorney, Agent, or Firm* — Polsinelli LLP

(57) ABSTRACT

Systems and methods for enabling a visitor to access VR representations authored by different authors of locations in a virtual universe via a computer network are provided. A plurality of VR data sets may be stored. Each VR data set comprise web or IP camera VR datasets and may be independently authored by a respective author different from the other authors. One or more VR data servers may be adapted to access and transmit the VR data sets, and each VR data set may be associated with a VR data server for access to the VR data set. A domain server may be adapted to access and transmit domain data comprising the location within the universe of each VR representation and the network address of the VR data server associated with the VR representation. Further, a client host may be adapted to communicate with the domain server to receive domain data representing the network address of the VR data server associated with a selected VR representation, the client host further adapted to communicate with that VR data server to access the VR data set defining the VR representation without leaving the virtual universe.

20 Claims, 11 Drawing Sheets

Related U.S. Application Data continuation of application No. 14/147,437, filed on Jan. 3, 2014, now abandoned.

(60) Provisional application No. 61/786,548, filed on Mar. 15, 2013.

(58) Field of Classification Search
USPC ...... 348/14.01–14.16; 707/999.01, 217, 700; 709/217; 715/700
See application file for complete search history.

(56) References Cited

U.S. PATENT DOCUMENTS

| | | | |
|---|---|---|---|
| 5,757,358 A | 5/1998 | Osga | |
| 5,982,555 A | 11/1999 | Melville et al. | |
| 6,084,979 A | 7/2000 | Kanade et al. | |
| 6,151,060 A | 11/2000 | Tabata | |
| 6,152,563 A | 11/2000 | Hutchinson et al. | |
| 6,175,352 B1 | 1/2001 | Kay et al. | |
| 6,184,847 B1 | 2/2001 | Fateh et al. | |
| 6,282,362 B1 | 8/2001 | Murphy et al. | |
| 6,315,273 B1 | 11/2001 | Davies | |
| 7,298,378 B1* | 11/2007 | Hagenbuch ....... | G06F 17/30061 345/589 |
| 7,933,395 B1 | 4/2011 | Bailly et al. | |
| 7,970,240 B1 | 6/2011 | Chao et al. | |
| 8,803,912 B1 | 8/2014 | Fouts | |
| 9,254,438 B2 | 2/2016 | Finn et al. | |
| 9,256,347 B2 | 2/2016 | Finn et al. | |
| 9,318,026 B2 | 4/2016 | Peters et al. | |
| 9,437,159 B2 | 9/2016 | Moravetz | |
| 9,472,014 B2 | 10/2016 | Chan et al. | |
| 9,521,368 B1 | 12/2016 | Cronin | |
| 9,588,343 B2 | 3/2017 | Cronin | |
| 9,818,230 B2 | 11/2017 | Moravetz | |
| 9,838,506 B1 | 12/2017 | Cronin | |
| 2002/0038456 A1* | 3/2002 | Hansen ............. | H04N 7/17318 725/46 |
| 2004/0193441 A1 | 9/2004 | Altieri | |
| 2006/0028400 A1 | 2/2006 | Lapstun et al. | |
| 2006/0242680 A1 | 10/2006 | Johnson et al. | |
| 2008/0024392 A1 | 1/2008 | Gustafsson et al. | |
| 2008/0221843 A1 | 9/2008 | Shenkar et al. | |
| 2009/0005961 A1 | 1/2009 | Grabowski et al. | |
| 2009/0106672 A1 | 4/2009 | Burstrom | |
| 2010/0017728 A1 | 1/2010 | Cho et al. | |
| 2010/0083169 A1 | 4/2010 | Athsani et al. | |
| 2010/0088632 A1 | 4/2010 | Knowles et al. | |
| 2010/0102476 A1 | 4/2010 | Higgins | |
| 2010/0231706 A1 | 9/2010 | Maguire | |
| 2010/0238161 A1 | 9/2010 | Varga et al. | |
| 2010/0259471 A1 | 10/2010 | Takano et al. | |
| 2011/0043530 A1 | 2/2011 | Nozuki | |
| 2011/0087350 A1 | 4/2011 | Fogel et al. | |
| 2011/0214071 A1 | 9/2011 | Zyda et al. | |
| 2011/0219291 A1 | 9/2011 | Lisa | |
| 2011/0267419 A1 | 11/2011 | Quinn et al. | |
| 2011/0301760 A1 | 12/2011 | Shuster et al. | |
| 2011/0313779 A1 | 12/2011 | Herzog et al. | |
| 2012/0086727 A1 | 4/2012 | Korah et al. | |
| 2012/0154277 A1 | 6/2012 | Bar-zeev et al. | |
| 2012/0154557 A1 | 6/2012 | Perez et al. | |
| 2012/0249741 A1 | 10/2012 | Maciocci et al. | |
| 2012/0289147 A1 | 11/2012 | Raleigh et al. | |
| 2012/0311043 A1 | 12/2012 | Chen et al. | |
| 2013/0007668 A1 | 1/2013 | Liu et al. | |
| 2013/0021373 A1 | 1/2013 | Vaught et al. | |
| 2013/0057550 A1 | 3/2013 | Kishikawa et al. | |
| 2013/0069787 A1 | 3/2013 | Petrou | |
| 2013/0083009 A1 | 4/2013 | Geisner et al. | |
| 2013/0083063 A1 | 4/2013 | Geisner et al. | |
| 2013/0106674 A1 | 5/2013 | Wheeler et al. | |
| 2013/0120224 A1 | 5/2013 | Cajigas et al. | |
| 2013/0182891 A1 | 7/2013 | Ling | |
| 2013/0226528 A1 | 8/2013 | Hodgins et al. | |
| 2013/0227017 A1 | 8/2013 | Gahlings | |
| 2013/0246967 A1 | 9/2013 | Wheeler et al. | |
| 2013/0263016 A1 | 10/2013 | Lehtiniemi et al. | |
| 2013/0278531 A1 | 10/2013 | Pisaris-Henderson | |
| 2013/0321265 A1 | 12/2013 | Bychkov et al. | |
| 2013/0335303 A1 | 12/2013 | Maciocci et al. | |
| 2013/0335447 A1 | 12/2013 | Lu et al. | |
| 2013/0336629 A1 | 12/2013 | Mulholland et al. | |
| 2014/0063054 A1 | 3/2014 | Osterhout et al. | |
| 2014/0164921 A1 | 6/2014 | Salinas | |
| 2014/0172906 A1 | 6/2014 | Sud et al. | |
| 2014/0267581 A1 | 9/2014 | Cronin | |
| 2014/0280502 A1 | 9/2014 | Cronin | |
| 2014/0280503 A1 | 9/2014 | Cronin | |
| 2014/0280504 A1 | 9/2014 | Cronin | |
| 2014/0280505 A1 | 9/2014 | Cronin | |
| 2014/0280506 A1 | 9/2014 | Cronin | |
| 2014/0280644 A1 | 9/2014 | Cronin | |
| 2014/0282113 A1 | 9/2014 | Cronin | |
| 2015/0212322 A1 | 7/2015 | Moravetz | |
| 2015/0213778 A1 | 7/2015 | Moravetz | |
| 2017/0004654 A1 | 1/2017 | Moravetz | |
| 2017/0090460 A1 | 3/2017 | Andrew et al. | |
| 2017/0242479 A1 | 8/2017 | Cronin | |

FOREIGN PATENT DOCUMENTS

| | | |
|---|---|---|
| JP | H10-222287 | 8/1998 |
| JP | H11-095971 | 4/1999 |
| JP | 2003-280805 | 10/2003 |
| JP | 2011-228859 | 11/2011 |
| JP | 2013-168910 | 8/2013 |
| JP | 2013-258614 | 12/2013 |
| RU | 111703 | 12/2011 |
| WO | WO 2013/138607 | 9/2013 |
| WO | WO 2015/112359 | 7/2015 |
| WO | WO 2015/112361 | 7/2015 |

OTHER PUBLICATIONS

U.S. Appl. No. 14/460,275 Office Action dated Apr. 13, 2017.
U.S. Appl. No. 14/460,276 Office Action dated Apr. 13, 2017.
U.S. Appl. No. 14/460,280 Office Action dated Apr. 18, 2017.
U.S. Appl. No. 14/460,273 Office Action dated May 10, 2017.
U.S. Appl. No. 14/460,279 Office Action dated Jun. 15, 2017.
Japanese Patent Application 2016-546976 Notification of Reason(s) for Refusal dated Feb. 7, 2017.
U.S. Appl. No. 14/460,272, John Cronin, Personal Digital Assistance and Virtual Reality, filed Aug. 14, 2014.
U.S. Appl. No. 14/460,273, John Cronin, Real Time Unified Communications Interaction of a Predefined Location in a Virtual Reality Location, filed Aug. 14, 2014.
U.S. Appl. No. 14/460,275, John Cronin, Crowd and Cloud Enabled Virtual Reality Distributed Location Network, filed Aug. 14, 2014.
U.S. Appl. No. 14/460,276, John Cronin, System and Methods for Effective Virtual Reality Visitor Interface, filed Aug. 14, 2014.
U.S. Appl. No. 14/460,277, John Cronin, Virtual Reality Universe Representation Changes Viewing Based Upon Client Side Parameters, filed Aug. 14, 2014.
U.S. Appl. No. 14/460,279, John Cronin, Virtual Reality Interaction With 3D Printing, filed Aug. 14, 2014.
U.S. Appl. No. 14/460,280, John Cronin, Virtual Reality Enhanced Through Browser Connections, filed Aug. 14, 2014.
A Quality of Experience Model for Haptic Virtual Environments; Hamam et al., ACM Transaction on Multimedia Computing, Communications and Applications, vol. 10, No. 3, Article 28, pp. 1-23, Apr. 2014.
PCT Application No. PCT/US2015/010990 International Search Report and Written Opinion dated May 11, 2015.
PCT Application No. PCT/US2015/010994 International Search Report and Written Opinion dated May 1, 2015.
U.S. Appl. No. 14/283,082 Office Action dated Jul. 1, 2016.
U.S. Appl. No. 14/283,083 Office Action dated Sep. 30, 2015.
U.S. Appl. No. 14/460,272 Office Action dated Aug. 3, 2016.

(56) References Cited

OTHER PUBLICATIONS

U.S. Appl. No. 14/460,272 Office Action dated Jan. 14, 2016.
U.S. Appl. No. 14/460,277 Office Action dated Sep. 1, 2016.
U.S. Appl. No. 14/460,281 Final Office Action dated Feb. 29, 2016.
U.S. Appl. No. 14/460,281 Office Action dated Oct. 8, 2015.
U.S. Appl. No. 15/447,342, Justin Moravetz, Menu Navigation in a Head-Mounted Display, filed Mar. 2, 2017.
European Patent Application 15740676.0 Extended European Search Report dated Jul. 6, 2017.
Japanese Patent Application 2016-546976 Decision for Refusal dated Jul. 18, 2017.
Japanese Patent Application 2016-548227 Notification of Reason(s) for Refusal dated Jul. 18, 2017.
U.S. Appl. No. 15/813,032, Justin Moravetz, Method for Executing Functions in a VR Enviornment.
U.S. Appl. No. 14/460,272 Office Action dated Jul. 5, 2017.
U.S. Appl. No. 14/460,273 Final Office Action dated Nov. 2, 2017.
U.S. Appl. No. 14/460,275 Final Office Action dated Nov. 8, 2017.
U.S. Appl. No. 14/460,276 Final Office Action dated Nov. 9, 2017.
U.S. Appl. No. 14/460,280 Final Office Action dated Nov. 9, 2017.
U.S. Appl. No. 15/832,022, John Cronin, Virtual Reality Universe Representation Changes Viewing Based Upon Client Side Parameters, filed Dec. 5, 2017.
Hollerer, T., et al., "User interface management techniques for collaborative mobile augmented reality", Computers and Graphics, 25(5):799-810, Dec. 2001.
U.S. Appl. No. 15/813,032 Office Action dated Jan. 24, 2018.
U.S. Appl. No. 14/460,279 Final Office Action dated Feb. 1, 2018.
Chinese Patent Application 2015-80005815.1 First Office Action dated Oct. 30, 2017.
Russian Patent Application No. 2016134268 Office Action dated Oct. 18, 2017.
Russian Patent Application No. 2016134268 Search Report dated Sep. 25, 2017.
Russian Patent Application No. 2016134577 Office Action dated Aug. 18, 2017.
Russian Patent Application No. 2016134577 Search Report dated Aug. 18, 2017.

* cited by examiner

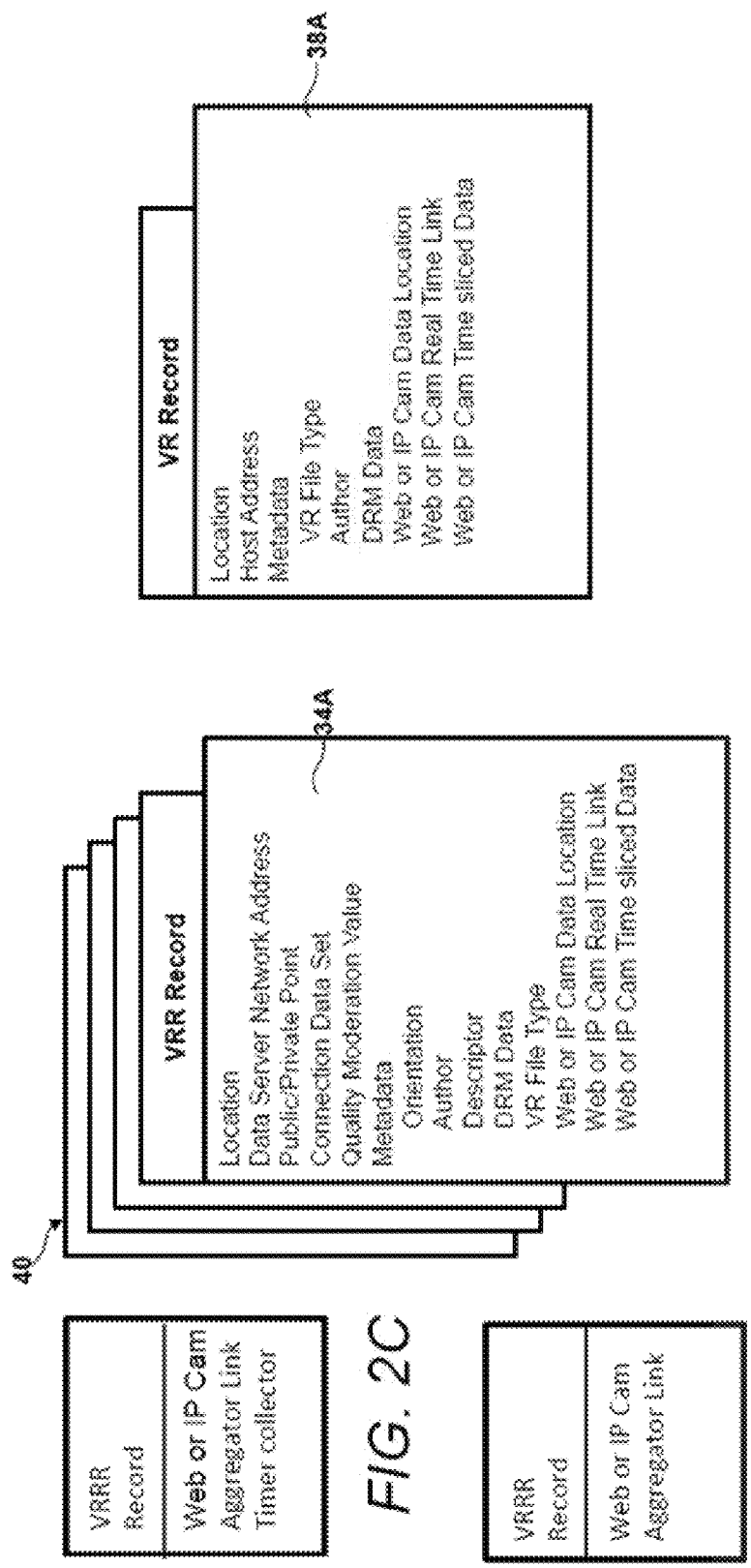

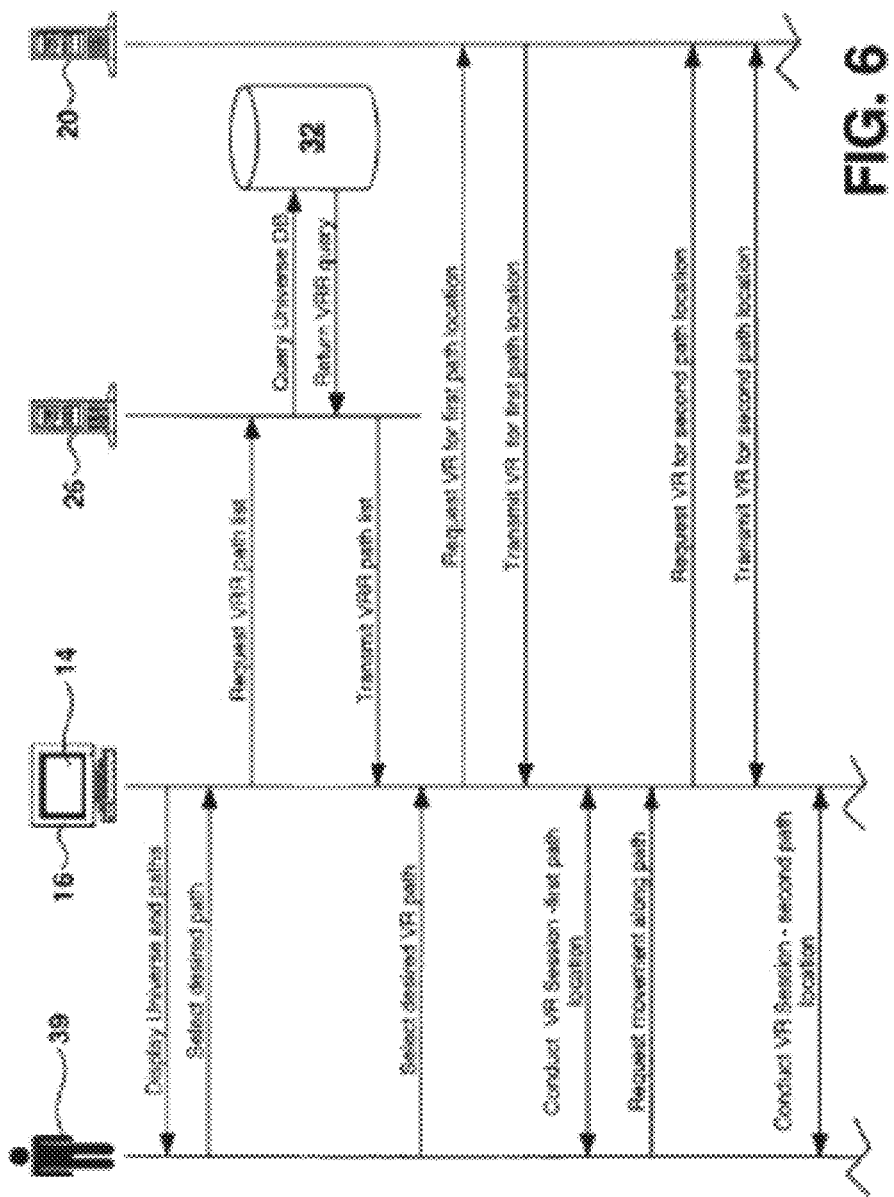

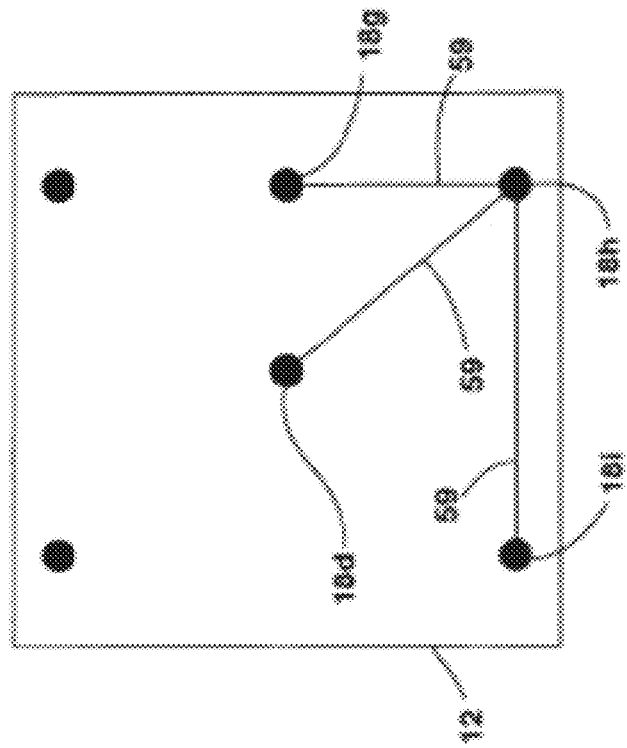
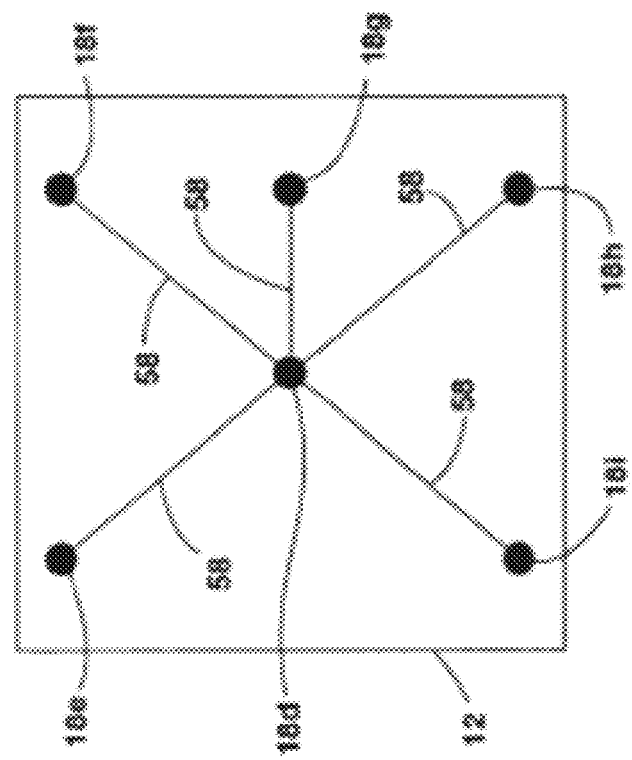

REAL TIME VIRTUAL REALITY LEVERAGING WEB CAMS AND IP CAMS AND WEB CAM AND IP CAM NETWORKS

CROSS REFERENCE TO RELATED APPLICATIONS

The present application is a continuation and claims the priority benefit of U.S. patent application Ser. No. 14/460,281 filed Aug. 14, 2014, issuing as U.S. Pat. No. 9,521,368, which is a continuation and claims the priority benefit of U.S. patent application Ser. No. 14/147,437 filed Jan. 3, 2014, now abandoned, which claims the priority benefit of U.S. provisional patent application 61/786,548 filed Mar. 15, 2013 entitled, "Real Time Virtual Reality Leveraging Web Cams," the disclosures of which are incorporated herein by reference.

BACKGROUND OF THE INVENTION

Field of the Invention

The present invention relates generally to computer-generated virtual reality representations of locations. Specifically, the present invention relates to storing, organizing, and providing access to a number of virtual reality representations whose data comes from spy cams and spy cam networks of web cams all through a computer network.

Description of the Related Art

Virtual reality (VR) models and simulates views from a location in virtual space. The visitor perceives the view from virtual space on a computer monitor or specialized display, and experiences "movement" by changing position or orientation within the virtual space. The visitor may even be "teleported" to different points in the virtual space.

Although recognized as having substantial potential, virtual reality has remained limited because it has yet to connect to the many cloud databases as well as many remote data gathering devices. As explained below, virtual reality representations model a single virtual space, and authoring virtual reality representations requires specialized computer programming or graphics skills. These factors have hindered broader adoption of virtual reality.

A virtual reality representation models a single volume, area, or point within virtual space. The representation may model physical space, such as a location or region on the Earth, or may model imaginary space in a video game. The visitor can move around in the virtual space, but is limited to remaining in that virtual space.

Authors are usually involved in creating virtual reality representations of the locations, or of related locations. These representations may exist on different websites, servers, or computers. There is a need to expand the data of virtual reality away from authors who happen to take pictures or video of a geo-location.

A webcam is a video camera that feeds its images in real time to a computer or computer network. An IP camera uses a direct connection using ethernet or Wi-Fi whereas a webcam is generally connected by a USB cable, FireWire cable, or similar cable.

The most popular use of these cameras is the establishment of video links, permitting computers to act as videophones or videoconference stations. The common use as a video camera for the World Wide Web gave the webcam its name. Other popular uses include security surveillance, computer vision, video broadcasting, and for recording social videos.

Webcams are known for their low manufacturing cost and flexibility making them the lowest cost form of video telephony. They have also become a source of security and privacy issues, as some built-in webcams can be remotely activated via spyware.

It is desirable to find a way to connect these web and IP cams to the virtual reality networks to take advantage of growing the virtual data base independent of authors.

In particular, it would be desirable that the web and IP camera representations be connected together in a way that enables the visitor to experience these representations. For example, if the locations modeled by a web or IP camera are of a physical location virtual reality visitors select, the visitor could choose that representation to experience. This creates a "virtual universe" made of separate virtual reality web or IP camera representations that can be toured by visitors.

There are also many websites that aggregate the collection of web cams or IP cameras for visitors to explore various geo-locations. However, these websites are not organized by virtual travel and further they are not linked to other forms of data. It would be advantageous to link these web cameras and IP cameras for improvement of visitor's experiences through virtual reality representations.

Prior art U.S. Pat. No. 7,298,378, Issues Nov. 20, 2007, "Virtual reality universe realized as a distributed location network" describes a virtual reality network which provides access to a number of virtual reality representations, each virtual reality representation representing a location in a virtual universe and defined by VR data stored on the network. The VR data can be in a simplified data format. A database stores the network address and the location in the universe of each virtual reality representation. A database server provides access to the database. The database server generates a list of locations in response to a location query from a visitor, and provides the network address of the virtual reality representation of a selected location. A visitor connects to the database server with a client host to visit the locations in the virtual universe. This patent does not describe connections to other data sources other than that created by hum authors.

SUMMARY OF THE CLAIMED INVENTION

The invention is a network capable of connecting web cameras and IP cameras to virtual reality representations together with other virtual reality data to form a virtual universe. The virtual reality representations can be in a simplified virtual reality format that requires no special computer programming or graphics skills to create.

A network in accordance with the present invention includes a number of virtual reality representations, each virtual reality representation representing a location in a virtual universe and defined by VR data stored on the network at a network address. For some locations in a virtual reality universe, real time data or time-sliced data (that is video or image data taken at various times) is available to add to the static virtual reality data.

A database stores the network address and the location in the universe of each virtual reality representation as well as stores the web camera or IP camera data as well as actual links to the web or IP cameras. A database server provides access to the database. The database server generates a list of locations in response to a location query from a visitor, and provides the network address of the virtual reality representation of a selected location.

The visitor connects to the network using a client host adapted to communicate with the domain server. The host receives data representing the network address of the VR data server associated with a selected VR representation. The host is also adapted to communicate with the VR data server to access the VR data set defining the VR representation.

In using the network, the visitor is preferably presented with a map displaying locations in the virtual universe. Each location is associated with a virtual reality representation accessible through the network. The visitor selects a location on the map he or she desires to visit. The domain server receives the selected location and retrieves from the database the network location of the data server providing access to the selected virtual reality representation. The domain server transmits the network address of the data server to the host, and the host communicates with the data server to receive the VR data defining the virtual reality representation. For web camera or IP camera connections, the domain server transmits the network address of the data server to the host, and the host communicates with the data server to receive the VR data from the web camera or IP camera stored or real time data defining the virtual reality representation.

In one possible embodiment, the client host includes a monitor that displays both the map and the virtual reality presentation generated from the static VR data along with data from web or IP cameras. In other possible embodiments the virtual reality presentation can utilize specialized hardware separate from the map display.

In preferred embodiments of the present invention, the network stores data representing paths in the virtual universe. A path is defined by at least two different locations in the universe. When the domain server receives a message from the host requesting virtual movement from a first location to a second location, the domain server communicates the network address of the data server associated with the second location to the host. The host then communicates with that data server and transitions from the first VR presentation to the VR presentation of the second location. The visitor perceives a substantially continuous movement along the path from the first location to the second location without leaving the virtual universe.

Paths can be defined in different ways in alternative embodiments of the network. The domain server can store predefined path definitions by storing a list of the locations defining the path. Alternatively, the domain server stores a data record for each location in the universe. The data set records the adjacent locations in the universe to define a path from each location to adjacent locations. In other alternative embodiments the path is defined in response to system events and then made available to the user.

The network preferably includes administrative software that enables new virtual reality representations of static VR data along with data from web or IP cameras to be added to the network. The virtual reality representations can be stored on existing data servers on the network, or stored on data servers that are themselves added to the network. The database is updated to reflect the new locations in the virtual universe and the network addresses of the data servers accessing the representations.

In one advantageous embodiment of the present invention, the virtual universe is divided into public and private regions. Any author can add to the network a virtual reality static VR data along with data from web or IP cameras representation of a location in the public region of the universe. Only authorized authors can add representations in private regions of the universe.

In another advantageous embodiment of the present invention, the network is operated as a self-regulating virtual reality universe. The network preferably provides visitor access to a number of virtual reality representations, each authored by a different author or data from web or IP cameras. The domain server receives ratings from visitors to the quality of the virtual reality representations they visited, and assesses the quality of each virtual reality representation based on the ratings provided by the visitors.

Action is then taken regarding a virtual reality based on the assessed quality of the virtual reality representation. The quality can be rated as a running average of visitor ratings. If the rating falls below a predetermined score, visitor access to the representation can be removed or the representation can be removed from the network. Preferably the action is taken automatically and without human intervention so that the network is self-regulating.

To simplify creation of virtual reality representations, the VR data can be stored in a simplified file format that stores digital photographs taken from a specific geographic location. An author either provides the links to the web or IP cameras, as well as can determining timing of collecting snapshots of the web or IP cameras. Also an author provides a link to a website of web or IP cameras with software able to identify a particular web or IP camera based upon the geo location requested. Also an author takes a number of photographs from the location with a digital camera. The photographs are preferably in JPG format but other "digital film" formats can be used. Each photograph preferably is taken in a different viewing direction, preferably viewing north, south, east, and west. The images are uploaded to the network along with geographical data (for example, latitude and longitude) that identifies where the photographs were taken. The domain server stores the images, the viewing direction associated with each image, and geographical data in a single data file on a data server. The domain server updates its database of either the static VR data or real time or time sliced data from web or IP cameras. associating the geographical location with a virtual location in the virtual universe. The virtual representation is now accessible to visitors, and the photographs are displayed when generating the virtual reality presentation of the virtual location.

A virtual reality network in accordance with the present invention offers many advantages. A number of different virtual reality representations are made available to visitors through a single, centrally accessible domain server. The domain server enables visitors to experience virtual reality representations created by different authors, and to tour a virtual universe created by logically organizing and connecting the separate representations.

Authors can easily add new virtual reality representations of either the static VR data or real time or time sliced data from web or IP cameras to the network, enabling visitors to experience a virtual reality universe that grows richer and richer with time. With the simplified VR file format, persons may share with others their travels to places around the world, or may easily create their own virtual universe for business or private use.

Other objects and features of the present invention will become apparent as the description proceeds, especially when taken in conjunction with the accompanying eight drawing sheets illustrating an embodiment of the invention.

It is also understood; that there are many ways that the databases can be connected to, as in this case servers are defined by holding data by geo-locations, but it can be connected in any other cloud based structure.

BRIEF DESCRIPTION OF THE DRAWINGS

FIG. 2A is a schematic view of a web cam or IP camera virtual reality representation record used in the network shown in FIG. 1;

FIG. 2B is a schematic view of a web cam or IP camera links virtual reality representation record used in the network shown in FIG. 1;

FIG. 2C is a schematic view of a web cam or IP camera links and timer of the link of virtual reality representation record used in the network shown in FIG. 1;

FIG. 3A is a schematic view of a virtual reality web cam or IP camera record used in the network shown in FIG. 1;

FIG. 6 is a sequence diagram similar to FIG. 4 illustrating a visitor moving along a path in the virtual universe;

FIG. 7A and FIG. 7B represent paths in the virtual universe extending between adjacent locations in the universe;

DETAILED DESCRIPTION

Systems and methods for enabling a visitor to access VR representations authored by different authors of locations in a virtual universe via a computer network are provided. A plurality of VR data sets may be stored. Each VR data set comprise web or IP camera VR datasets and may be independently authored by a respective author different from the other authors. One or more VR data servers may be adapted to access and transmit the VR data sets, and each VR data set may be associated with a VR data server for access to the VR data set. A domain server may be adapted to access and transmit domain data comprising the location within the universe of each VR representation and the network address of the VR data server associated with the VR representation. Further, a client host may be adapted to communicate with the domain server to receive domain data representing the network address of the VR data server associated with a selected VR representation, the client host further adapted to communicate with that VR data server to access the VR data set defining the VR representation without leaving the virtual universe.

Users or visitors may use any number of different electronic computing client devices, which can include, but is not limited to, general purpose computers, mobile phones, smartphones, personal digital assistants (PDAs), portable computing devices (e.g., laptop, netbook, tablets), desktop computing devices, handheld computing device, or any other type of computing device capable of communicating over a communication network. Such devices are preferably configured to access data from other storage media, such as, but not limited to memory cards or disk drives as may be appropriate in the case of downloaded services. Such devices preferably include standard hardware computing components such as, but not limited to network and media interfaces, non-transitory computer-readable storage (memory), and processors for executing instructions that may be stored in memory.

Figure 1:
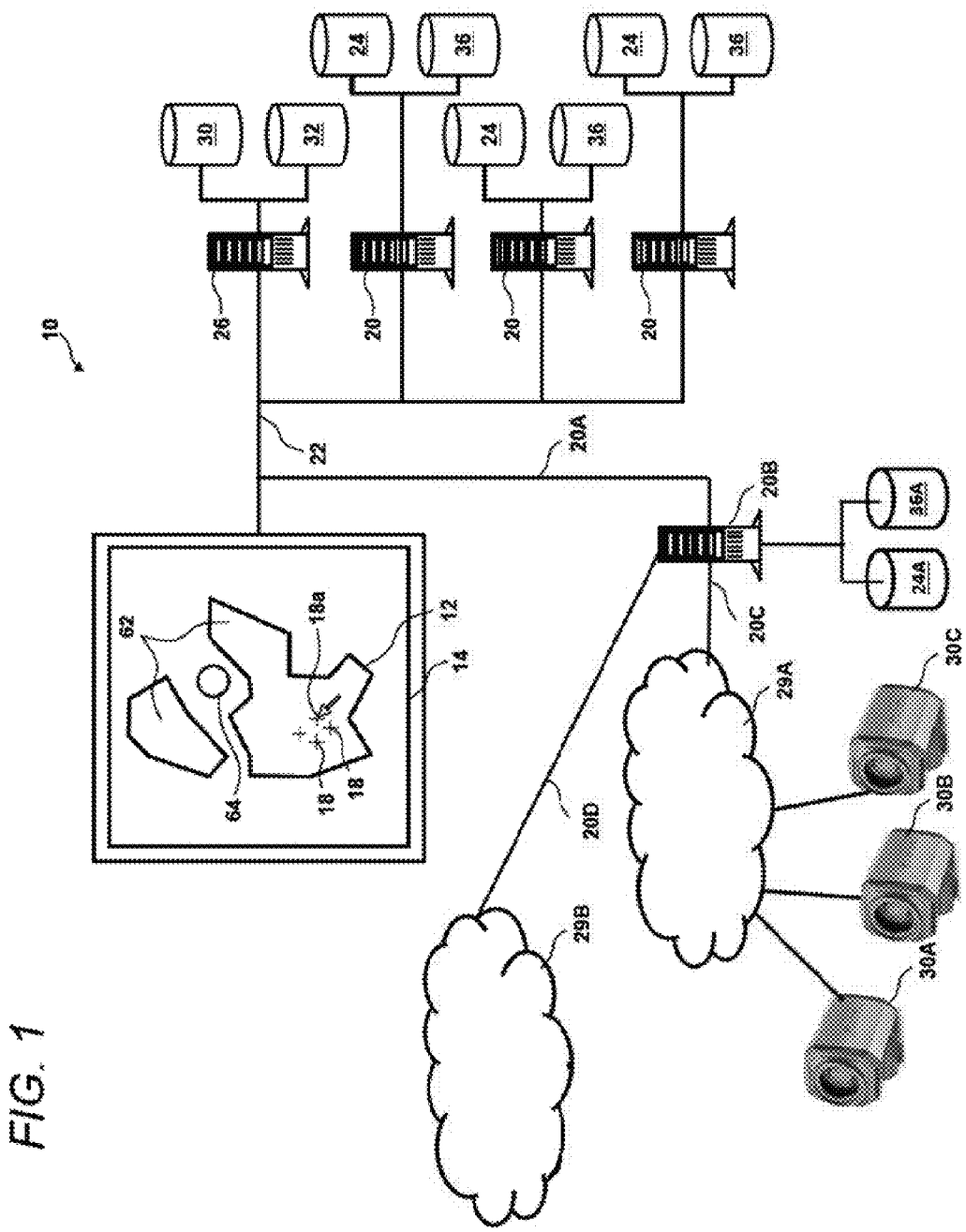
FIG. 1 is a schematic view of a virtual reality universe realized as a distributed location network in accordance with the present invention.

FIG. 1 illustrates a distributed location network 10 in accordance with the present invention.

The network 10 enables a visitor to visit and explore a virtual universe. FIG. 1 illustrates a map 12 of the virtual universe displayed on a visitor's computer monitor by a software program or virtual reality browser (VR browser) 14 running on a visitor's computer 16 connected as a network client. The universe can model a real or tangible space, such as the surface of the Earth, with the universe representing real or tangible locations in physical space. Alternatively, the universe can model an imaginary space, such as L. Frank Baum's Oz or a stick model of a protein molecule, with the universe representing imaginary locations in nonphysical space.

The network 10 is preferably a local, proprietary network (e.g., an intranet) and/or is alternatively a part of a larger wide-area network (e.g., the cloud). The network 10 can be a local area network (LAN), which is communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provide.

The visitor explores the universe by selecting and viewing virtual reality presentations of virtual locations or points 18 on the map 12. Each point 18 represents a location in the universe that has at least one virtual reality representation available for a visitor to access and experience. A point 18 can model a point, area or volume in the virtual universe and a visitor may be capable of moving about the area or volume if the virtual reality presentation enables it.

The VR browser 14 retrieves the data for the virtual reality representations from virtual reality data servers (VR data servers) 20. VR data servers 20 are connected to the browser 14 by network connections 22. The network connections 22 may be through a Local Area Network (LAN) or a global network such as the Internet. VR data servers 20 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Each VR data server 20 provides access to VR data 24 for a virtual reality representation of the selected point 18. Data can be stored in conventional virtual reality file formats such as QUICKTIME, X3D, VRML, and the like, or can be stored as separate digital image files. VR data 24 can be stored on the VR data server 20 or stored on additional network data servers (not shown) distributed through the network 10.

The entire network 10, including the network client 16 and the servers 20 and 26, may also be hosted on a single computer if a distributed network is not required.

A point 18 may have a number of different virtual reality representations served by a number of different VR data servers 20. These representations may be stored in different file formats, may represent the point in different seasons of the year or in different historical eras, or may provide an alternative or augmented user interface or sensory experience. Of course, a particular data server 20 could serve a number of virtual reality representations of a point 18 or different points 18.

A domain server 26 hosts a universe database 30 for displaying the map 12 and the points 18 on the map 12. The database 30 preferably includes graphic files, image files, and other data for generating and displaying the map 12. The universe database 30 may also include the network addresses or network paths to the VR files associated with the virtual reality representations.

The domain server 26 also maintains a network database 32 that stores information about each point 18 and the network addresses of the one or more VR data servers 20 that provide access to VR representations of the point 18.

The network database 32 holds a number of virtual reality representation records (VRR records) 34.

FIG. 1. also shows connection 20A to web or IP camera server 20B. Web or IP camera server 20B is connected to network database 24A and 32A of virtual representation records 34A (see FIG. 2A) and 38A (see FIG. 3A). Web or IP camera server 20B is also connected (thru connection 20C) to internet cloud 29A which in turn connects to numerous web or IP cameras examples 30A, 30B and 30C. Web or IP camera server 20B is also connected (thru connection 20D) to internet cloud 29B which connects to numerous web or IP cameras website.

Figures 2, 3:
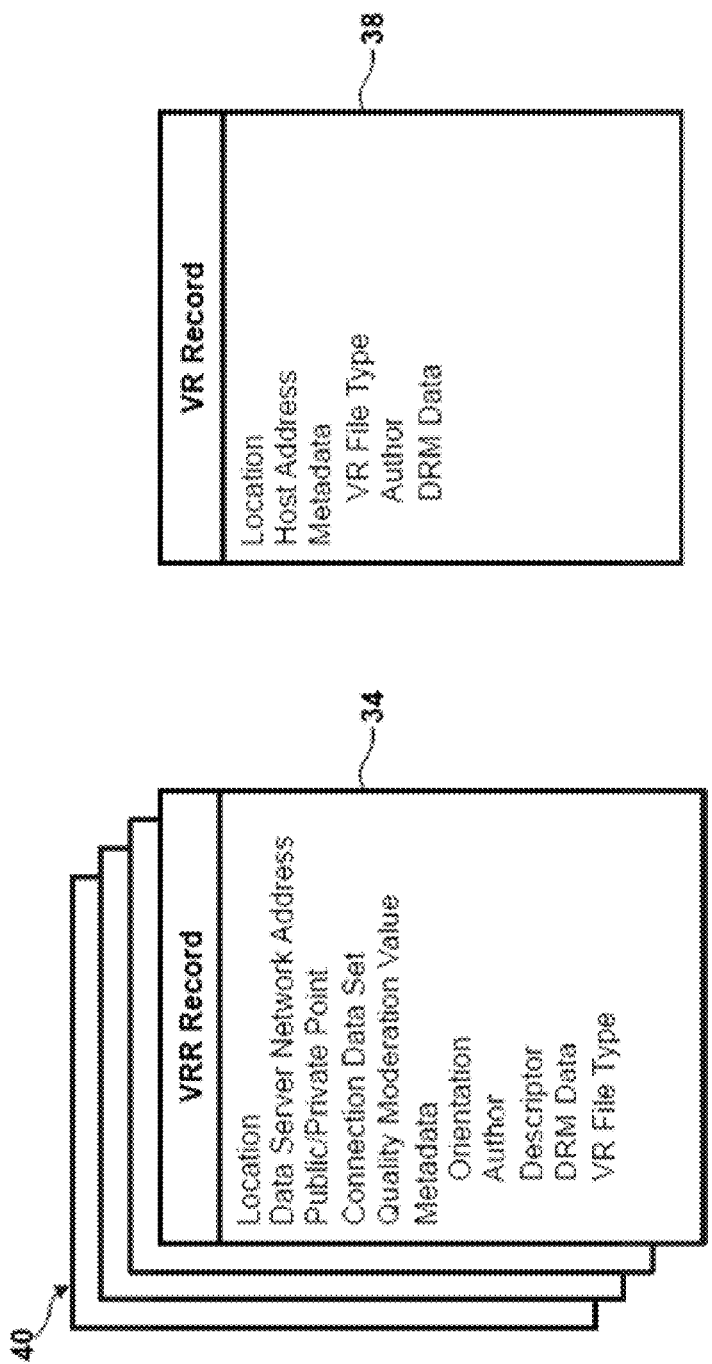
FIG. 2 is a schematic view of a virtual reality representation record used in the network shown in FIG. 1.
FIG. 3 is a schematic view of a virtual reality record used in the network shown in FIG.

FIG. 2 illustrates a typical VRR record 34. The VRR record 34 is a data structure that provides information enabling the VR browser 14 to locate the VR data server 20 providing access to a specific VR representation. A VRR record 34 includes the location of the point 18 and the network address of the VR data server 20 associated with the VR representation of the point 18.

The VRR record 34 preferably also includes metadata providing additional information about the point 18, the associated VR data server 20, and the virtual reality representation of the point 18. Metadata can include the author, VR file format, or a description of the VR representation. Other metadata can include digital rights management (DRM) information, initial orientation or direction of the default opening view of the virtual reality representation, or the like.

Each VR data server 20 maintains a local database 36 that records the location or locations of the VR data 24 accessed through the VR data server 20 (see FIG. 1). The local database 36 holds a virtual reality record (VR record) 38 for each representation accessed through the VR data server 20.

FIG. 2A illustrates a typical VRR record 34A. The VRR record 34A is a data structure that provides information enabling the VR browser 14 to locate the VR data server 20B providing access to a specific VR representation. A VRR record 34A includes the location of the point 18 and the network address of the VR data server 20B associated with the VR web or IP camera representation of the point 18.

The VRR record 34A preferably also includes metadata providing additional information about the point 18, the associated VR data server 20B, and the virtual reality wen or IP camera representation of the point 18. Metadata can include the author, VR file format, or a description of the VR representation. Other metadata can include digital rights management (DRM) information, initial orientation or direction of the default opening view of the virtual reality representation, or the like. Other metadata includes Web or IP Cam Data Location, Web or IP Cam Real Time Link (the link to the real time web or IP camera) and Web or IP Cam Time sliced Data (that is data that is collected at various times from web or IP cameras).

Each VR data server 20B maintains a local database 36A that records the location or locations of the VR data 24A accessed through the VR data server 20B (see FIG. 1). The local database 36A holds a virtual reality record (VR record) 38A for each representation accessed through the VR data server 20B.

FIG. 2B shows example VRR record for Web or IP Cameras storing the Web or IP Cam Aggregator Link (hyper link to the web or IP cameras).

FIG. 2C shows example VRR record for Web or IP Cameras storing the Web or IP Cam Aggregator Link timer collector that is the time data that tells the network when to take a snapshot data of any connected Web or IP camera. In this way, the web or IP camera data stored can be stored over time.

FIG. 3 illustrates a typical VR record 38. The VR record 38 is a data structure that includes the location of the point 18, the location of the VR data 24 for the representation of the point, and metadata containing further information about the VR data 24. For example, such metadata may include the author and digital rights management (DRM) information, VR data format, or descriptive information about the VR representation.

The universe database 30, the network database 32, or a local database 36 can be realized as a single-file relational database, object database, or hierarchal XML database. Alternatively, a database 30, 32, 36 can be realized as a number of separate data files, wherein each data record is stored in a respective data file. The data file can be in structured text file format, XML format, or other conventional data format. The selection of database schema and format is based on conventional software engineering considerations, including the network architecture, the network load, and available software.

FIG. 3A illustrates a typical VR record 38A. The VR record 38A is a data structure that includes the location of the point 18, the location of the web or IP camera VR data 24A for the representation of the point, and metadata containing further information about the VR data 24A. For example, such metadata may include the author and digital rights management (DRM) information, VR data format, or descriptive information about the VR representation. Other metadata includes Web or IP Cam Data Location, Web or IP Cam Real Time Link (the link to the real time web or IP camera) and Web or IP Cam Time sliced Data (that is data that is collected at various times from web or IP cameras).

The universe database 24, the network database 24A, or a local database 36A can be realized as a single-file relational database, object database, or hierarchal XML database. Alternatively, a database 30, 24A, 36A can be realized as a number of separate data files, wherein each data record is stored in a respective data file. The data file can be in structured text file format, XML format, or other conventional data format. The selection of database schema and format is based on conventional software engineering considerations, including the network architecture, the network load, and available software.

Figure 4:
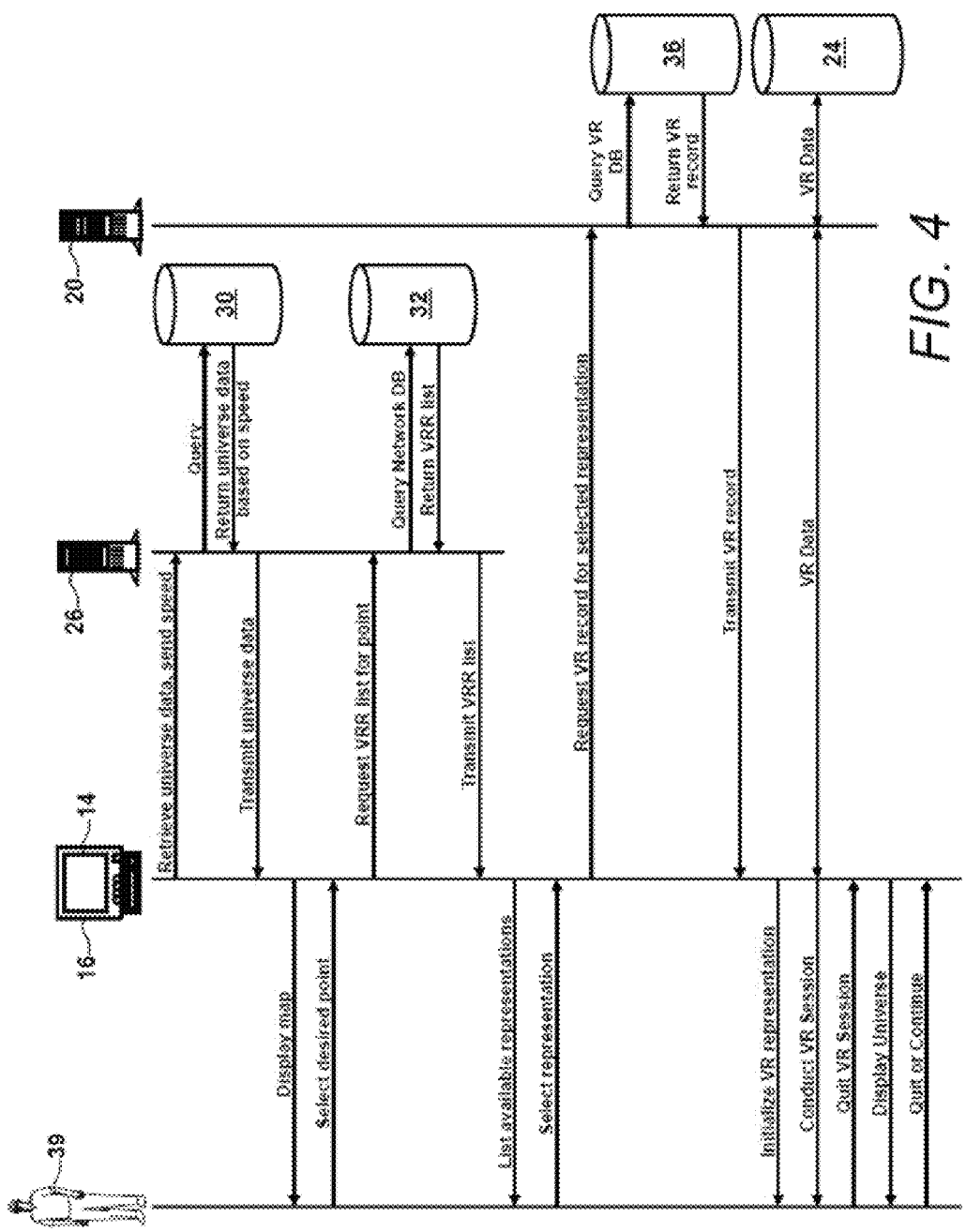
FIG. 4 is a sequence diagram illustrating a visitor utilizing a client host communicating with the network shown in FIG. 1 to view a location in the virtual universe.

FIG. 4 illustrates a first user session wherein a visitor 39 explores the virtual universe point-by-point. For clarity only one visitor is shown connected to the network 10, but it should be understood that a number of visitors can simultaneously explore the universe.

The VR browser 14 retrieves the map data 30 from the domain server 26 and begins the user session by displaying the map 12 shown in FIG. 1. The map 12 displays the points 18, and the user interface of the VR browser 14 enables the visitor 39 to select which point 18 and the representation of the selected point 18 he or she would like to experience.

It should be understood that the universe database 30 may include or enable generation of a number of different maps representing different regions or sub-regions of the universe. The VR browser 14 may simultaneously or sequentially display different maps during a user session. For example, the visitor is initially presented with a "master map" or model of the entire universe. If the virtual universe is sufficiently extensive, the user interface of the VR browser 14 enables users to "drill down" and select more detailed maps or models of sub-regions (for example, maps representing a continent, a country, a city, and then a city block) to select a desired point 18.

Map 12 should therefore be understood to represent all possible maps the VR browser 14 may display as part of its user interface. Maps may be representations of one-dimensional, two-dimensional, three-dimensional, or n-dimensional space as is appropriate for the virtual universe such maps represent.

The map 12 may also display additional information that assists the visitor in selecting a point or a VR representation of the point. For example, the map might indicate points of historical interest or the number and types of virtual reality representations available for each point.

In the illustrated embodiment, the visitor selects a desired point 18a from the map 12 by clicking the mouse (see FIG. 1). The browser 14 determines the location of the selected point 18a on the map and requests a list 40 of VRR records 34 associated with that point from the domain server 26 (see FIG. 2).

The domain server 26 queries the network database 32 for the list of VRR records of points at or proximate to the selected point 18a. The domain server 26 returns the VRR list 40 to the VR browser 14. The VR browser 14 generates a list of available VR representations from the VRR list 40, and displays the list for the selected point 18a.

The display list can include information from the metadata to assist the visitor in selecting a VR representation to experience. For example, the VR browser 14 might display an icon for each representation indicating some characteristic of the representation (such as season of the year, its VR file format, or quality moderation value (discussed in further detail below)).

The visitor selects from the display list the desired virtual reality representation to experience. If there is only one representation associated with the selected point, the steps of displaying and selecting from the list can be eliminated.

The VR browser 14 uses the VRR record 34 associated with the selected representation to look up the network address of the VR data server 20 providing access to the virtual representation. The VR browser 14 requests the VR record 38 for the selected representation from the VR data server 20. The VR browser 14 uses the returned VR record 38 to fetch the VR data file 24 and initialize a virtual reality presentation that will be perceived and experienced by the visitor 39. For example, the VR browser 14 could start one helper application to display a QUICKTIME presentation and another helper application to display a VRML presentation.

In the illustrated embodiment, the VR browser 14 displays the map 12 in a first window and the virtual reality presentation in a second window (discussed in greater detail later). In other embodiments, virtual reality presentations could be displayed independently of the VR browser 14 through more specialized or augmented VR hardware, such as a headset.

During the VR presentation, the VR browser 14 receives input from the visitor and communicates with the VR data server 20 to fetch the VR data 36. The visitor can change the point of view and move about the presentation as permitted by the virtual reality representation being experienced. When the visitor ends the VR presentation, the window displaying the VR presentation closes or goes blank. The visitor 39 can then select a new point 18 or quit the application.

In addition to exploring selected points 18, the network 10 enables the visitor 39 to explore paths through the universe. See, for example, path 42 shown in FIG. 5. A path is defined as extending along a set of points or extending between start and end points in the universe. The network 10 supports multiple types of paths as will be described in further detail below.

A visitor sequentially experiences virtual reality presentations of the points 18 on the path. The VR browser 14 automatically moves from displaying one VR presentation to the next in response to visitor input indicating movement along the path. This provides the visitor with the perception of walking through or being "immersed" in the universe. If the points 18 are sufficiently close together, the visitor will essentially perceive continuous or seamless movement through the virtual universe.

Path 42 represents a pre-defined path. A pre-defined path is defined prior to the user session and may, for example, represent a virtual river, highway, or historical trail through the universe. Pre-defined paths are preferably defined in the universe database 30 and represented on the map 12 for selection by the visitor 39.

Figure 4A:
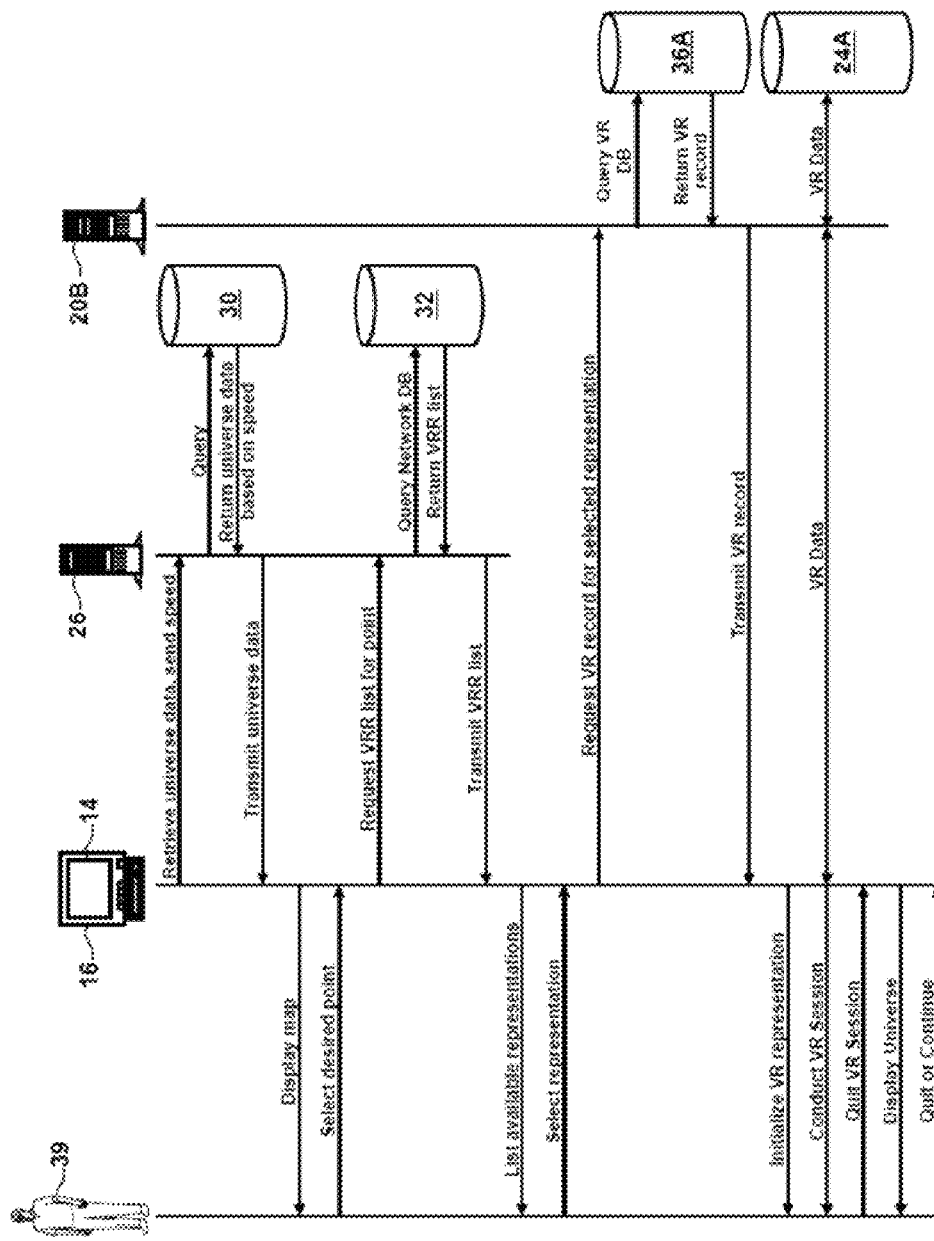
FIG. 4A is a sequence diagram illustrating a visitor utilizing a client host communicating with the web or IP cameras data network shown in FIG. 1 to view a location in the virtual universe.

FIG. 4A illustrates a first user session wherein a visitor 39 explores the virtual universe point-by-point. For clarity only one visitor is shown connected to the network 10, but it should be understood that a number of visitors can simultaneously explore the universe.

The VR browser 14 retrieves the map data 30 from the domain server 26 and begins the user session by displaying the map 12 shown in FIG. 1. The map 12 displays the points 18, and the user interface of the VR browser 14 enables the visitor 39 to select which point 18 and the representation of the selected point 18 he or she would like to experience.

It should be understood that the universe database 30 may include or enable generation of a number of different maps representing different regions or sub-regions of the universe.

The VR browser 14 may simultaneously or sequentially display different maps during a user session. For example, the visitor is initially presented with a "master map" or model of the entire universe. If the virtual universe is sufficiently extensive, the user interface of the VR browser 14 enables users to "drill down" and select more detailed maps or models of sub-regions (for example, maps representing a continent, a country, a city, and then a city block) to select a desired point 18.

Map 12 should therefore be understood to represent all possible maps the VR browser 14 may display as part of its user interface. Maps may be representations of one-dimensional, two-dimensional, three-dimensional, or n-dimensional space as is appropriate for the virtual universe such maps represent.

The map 12 may also display additional information that assists the visitor in selecting a point or a VR representation of the point. For example, the map might indicate points of historical interest or the number and types of virtual reality representations available for each point.

In the illustrated embodiment, the visitor selects a desired point 18a from the map 12 by clicking the mouse (see FIG. 1). The browser 14 determines the location of the selected point 18a on the map and requests a list 40 of web or IP camera VRR records 34A associated with that point from the domain server 26 (see FIG. 2).

The domain server 26 queries the network database 32 for the list of VRR records of points at or proximate to the selected point 18a. The domain server 26 returns the VRR list 40 to the VR browser 14. The VR browser 14 generates a list of available VR representations from the VRR list 40, and displays the list for the selected point 18a.

The display list can include information from the metadata to assist the visitor in selecting a VR representation to experience. For example, the VR browser 14 might display an icon for each representation indicating some characteristic of the representation (such as season of the year, its VR file format, or quality moderation value (discussed in further detail below)).

The visitor selects from the display list the desired virtual reality representation to experience. If there is only one representation associated with the selected point, the steps of displaying and selecting from the list can be eliminated.

The VR browser 14 uses the web or IP camera VRR record 34A associated with the selected representation to look up the network address of the VR web or IP camera data server 20B providing access to the virtual representation. The VR browser 14 requests the VR record 38 for the selected representation from the VR data server 20B. The VR browser 14 uses the returned web or IP camera VR record 38A to fetch the web or IP camera VR data file 24A and initialize a virtual reality presentation that will be perceived and experienced by the visitor 39. For example, the VR browser 14 could start one helper application to display a QUICKTIME presentation and another helper application to display a VRML presentation.

In the illustrated embodiment, the VR browser 14 displays the map 12 in a first window and the virtual reality presentation in a second window (discussed in greater detail later). In other embodiments, virtual reality presentations could be displayed independently of the VR browser 14 through more specialized or augmented VR hardware, such as a headset.

During the VR presentation, the VR browser 14 receives input from the visitor and communicates with the VR data server web or IP camera 20B to fetch the web or IP camera VR data 36A. The visitor can change the point of view and move about the presentation as permitted by the virtual reality representation being experienced. When the visitor ends the VR presentation, the window displaying the VR presentation closes or goes blank. The visitor 39 can then select a new point 18 or quit the application.

In addition to exploring selected points 18, the network 10 enables the visitor 39 to explore paths through the universe. See, for example, path 42 shown in FIG. 5. A path is defined as extending along a set of points or extending between start and end points in the universe. The network 10 supports multiple types of paths as will be described in further detail below.

A visitor sequentially experiences virtual reality presentations of the points 18 on the path. The VR browser 14 automatically moves from displaying one VR presentation to the next in response to visitor input indicating movement along the path. This provides the visitor with the perception of walking through or being "immersed" in the universe. If the points 18 are sufficiently close together, the visitor will essentially perceive continuous or seamless movement through the virtual universe.

Path 42 represents a pre-defined path. A pre-defined path is defined prior to the user session and may, for example, represent a virtual river, highway, or historical trail through the universe. Pre-defined paths are preferably defined in the universe database 30 and represented on the map 12 for selection by the visitor 39.

Figure 5:
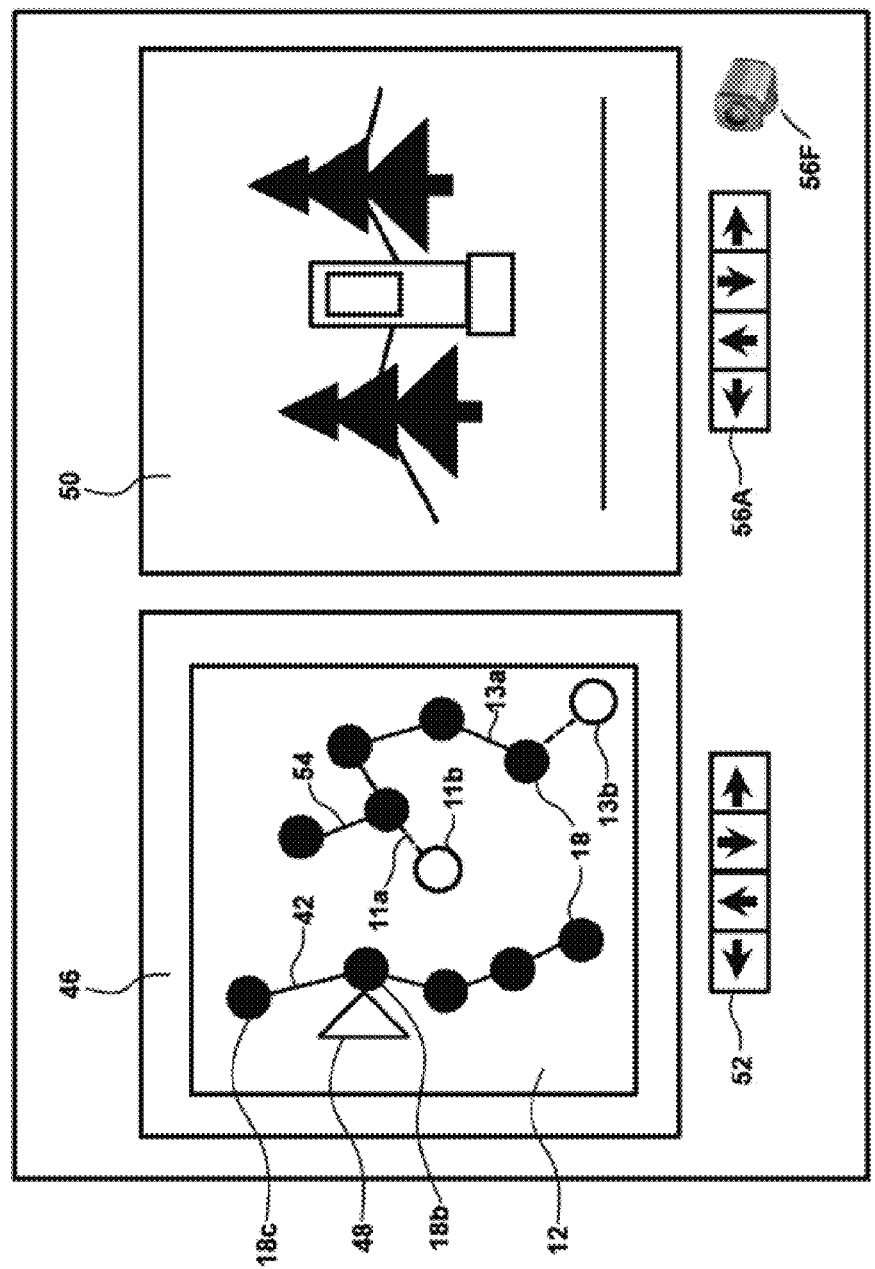
FIG. 5 is a view of the client host display displaying a map of the universe and a virtual reality presentation of a location in the virtual universe.

FIG. 5 illustrates the VR browser 14 with a first display window 46 and a second display window 50. Display window 46 displays the map 12, the path 42, and the points 18 along the path 42 as shown. The second window 50 displays the virtual reality presentation of the active, or currently visited, point 18b.

When displaying a virtual reality presentation of a point 18, the VR browser 14 preferably displays an icon 48 indicating the active point 18. The illustrated icon 48 is an arrow that also indicates the approximate direction of the current line of view of the virtual reality presentation shown in the second window 50. Icon 48 is shown indicating that point 18b is the active point and that the direction of the current line of view is west.

Navigation widgets 52 associated with the first window 46 enable the visitor to move along the path 42 or to move to a different path (such as a second path 54). Navigation widgets 56 associated with the second window 50 enable the visitor to change the line of view of the VR presentation in the second window 50. Widgets 52 and 56 can be combined into a single control if desired, and alternative known interface controls (including the mouse) or other interface widgets may replace or be used with the widgets 52, 56.

Figure 5A:
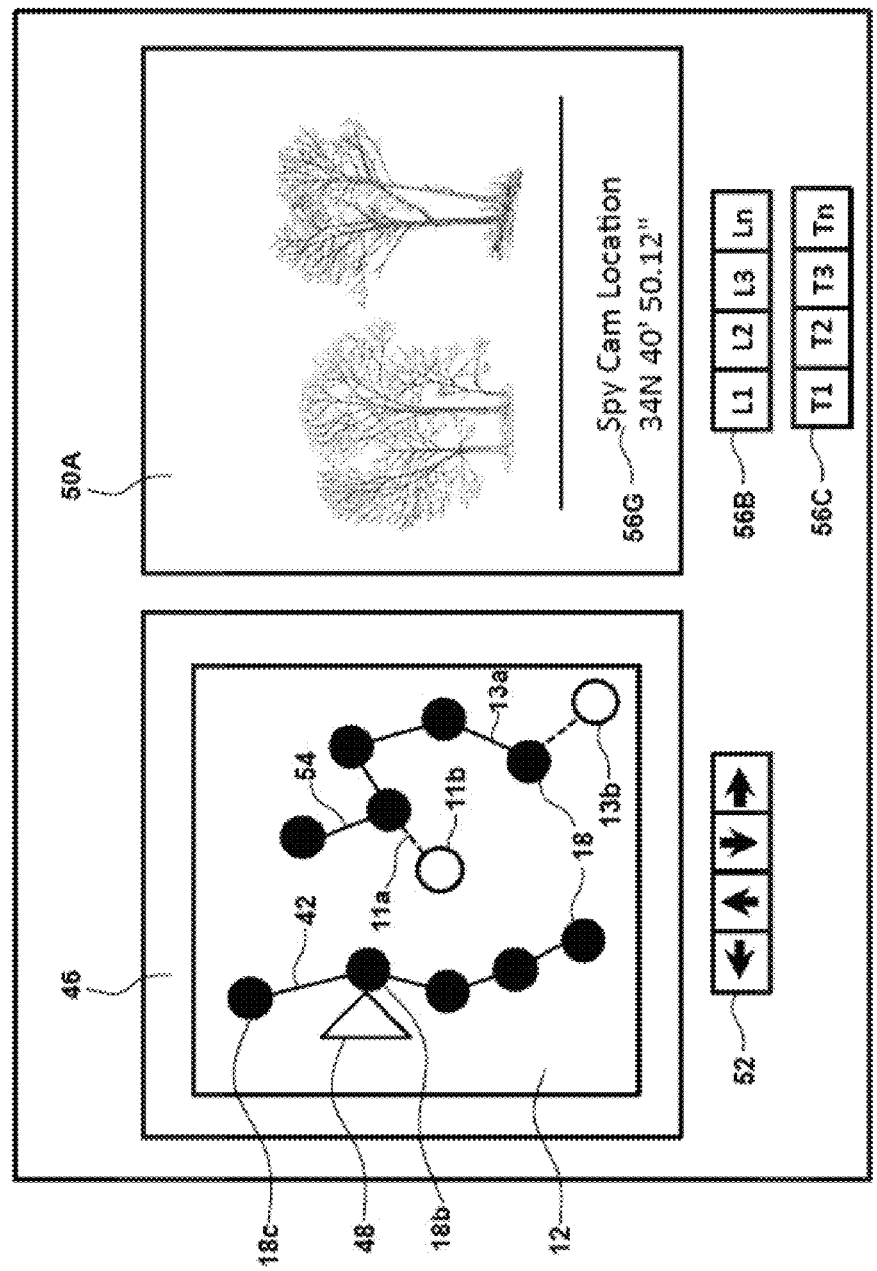
FIG. 5A is a view of the client host display displaying a map of the universe and a virtual reality presentation of web camera or IP camera data of a location in the virtual universe.

56F is a widget that when activated, will manifest web or IP camera data of the point be viewed as shown in FIG. 5A.

FIG. 5A illustrates the VR browser 14 with a first display window 46 and a second display window 50A. Display window 46 displays the map 12, the path 42, and the points 18 along the path 42 as shown. The second window 50A displays the web or IP camera virtual reality presentation of the active, or currently visited, point 18b.

When displaying a virtual reality presentation of a point 18, the VR browser 14 preferably displays an icon 48 indicating the active point 18. The illustrated icon 48 is an arrow that also indicates the approximate direction of the current line of view of the virtual reality presentation shown in the second window 50A. Icon 48 is shown indicating that point 18b is the active point and that the direction of the current line of view is west.

Navigation widgets 52 associated with the first window 46 enable the visitor to move along the path 42 or to move to a different path (such as a second path 54).

IP or web camera navigation data 56G shows the actual longitude and latitude or the location of the image shown in 50A.

IP or web camera navigation widgets 56B associated with the second window 50A enable the visitor to change the location of the web or IP camera, that is, some remote cameras are capable of being remotely changed. This allows the visitor to travel around the location point in real time.

IP or web camera navigation widgets 56C associated with the second window 50A enable the visitor to change the time that the image for the web or IP camera picture was taken. This allows the visitor to go from real time, to time sliced data, so the visitor can see the past.

FIG. 6 illustrates a second user session in which the visitor moves along and explores the path 42 (the database 36 and VR data 24 are omitted from the drawing). The VR browser 14 retrieves the map and path data from the universe database 30 and displays the map 12 as shown in FIG. 5.

The visitor selects the desired path 42, and the VR browser 14 obtains the VRR record list 40 for the points 18 on the path 42 from the domain server 26. For simplicity, it is assumed that each point 18 on the path 42 has only one virtual reality representation; so each VRR record 34 is associated with a single point 18 on the path 42.

The VR browser 14 uses the VRR record 34 associated with the path's starting point 18c to look up the network address of the appropriate VR data server 20 and retrieves the VR record 38 from that server 20. The VR record data is used to initialize and display the virtual reality presentation of the first, or starting point 18c (see FIG. 5). Widgets 56 control the line of view of the virtual reality presentation as described.

Widgets 52 move the visitor to the next, or second point on the path 42. The VR browser 14 uses the VRR record 34 associated with the next point to retrieve VR data for the next point. If the points 18 along the path 42 are sufficiently close, the transition from point to point appears to the visitor as a continuous movement along the path.

In moving from the virtual reality representation of one point to another, the VR browser 14 may also maintain (as closely as possible) the same line of view to maintain the appearance of continuous movement. For example, if the visitor is looking south and moves to the next point, the initial line of view for the next point is also viewing south. In alternative embodiments, however, the VR browser 14 can initialize each virtual reality presentation with a predetermined or default line of view.

A second type of path preferably supported by the network 10 is a connection path. A connection path is a dynamic path generated from an active point 18 to adjacent points 18 during the user session. FIG. 7A illustrates the map 12 displaying connection paths 58 extending between an active point 18d and adjacent points 18e-18i. Connection paths 58 connect two adjacent or neighboring points 18, enabling the visitor to pick and choose his or her own route through the universe.

The connection paths 58 typically provide multiple routes between points. For example, the visitor can move from point 18d to point 18h directly, or can move first to point 18g and then to point 18h. FIG. 7B illustrates the connection paths 59 when the visitor reaches point 18h. The paths 59 start from point 18h and end at points 18d, 18g, and 18i.

The VRR record(s) 34 for each point 18 preferably includes a connection data set (see FIG. 2) that lists adjacent points 18. For example, the connection data set for point 18d (shown in FIG. 7A) includes point's 18e-18i and the direction to each point. This enables the VR browser 14 to display the connection paths 58 available to the visitor; the VR browser 14 can also iteratively retrieve the VRR records of adjacent points to display a network of available paths on the map 12. The connection data set also allows the VR browser 14 to efficiently respond and display the next virtual reality presentation after receiving a visitor request to move in a given direction from active point 18d.

The domain server 26 generates the connection data set when a new point 18 is added to the network. The adjacent points 18 are retrieved from the universe database 30 to generate the connection data set for the new point 18.

Figure 8:
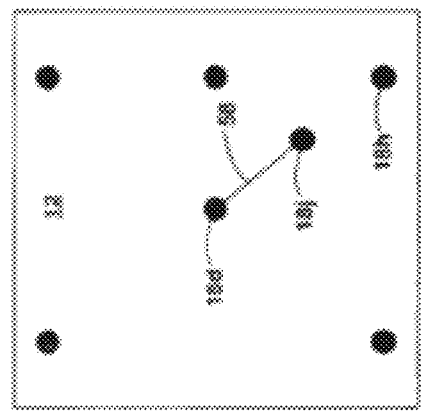
FIG. 8-FIG. 10 illustrate other paths in the virtual universe.
Figure 9:
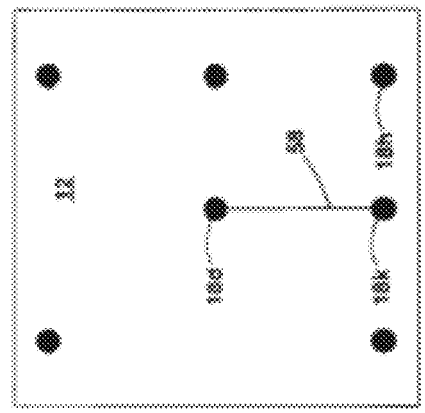

The domain server 26 also modifies the connection data set of adjacent points 18 as illustrated in FIG. 8 and FIG. 9. The maps 12 in FIGS. 8 and 9 are otherwise identical to the map 12 in FIG. 7A, but include a later-added point 18j or 18k, respectively. In FIG. 8, point 18j is inserted between points 18d and 18h. Point 18j is now adjacent to point 18d instead of point 18h. The connection data set associated with point 18d is modified to remove point 18h and to insert point 18j for the connection path 58 extending between points 18d and 18j. In FIG. 9, point 18k is an additional point adjacent to point 18d. Point 18k is added to the data connection set associated with point 18d for the connection path 58 extending between points 18d and 18k.

A visitor can also preferably edit the connection data set for a point 18 to add or subtract connection paths extending from the point. The visitor can add a remote point 18 to the data set, creating a connection path to that remote point. A point can be removed from the data set, eliminating a connection path. The modified data set can be stored on the visitor's machine 16 for use only by the visitor's browser 14, or the modifications can be saved in the network database 32 to be made available to all visitors.

A third type of path supported by the network 10 is the event path. An event path is a dynamic path generated by the network in response to an event or visitor query. For example, the visitor 39 may request the path from his or her current location to another location in the universe. The VR browser 14 queries the universe database 30 and displays the points 18 along the path on the map 12.

Figure 10:
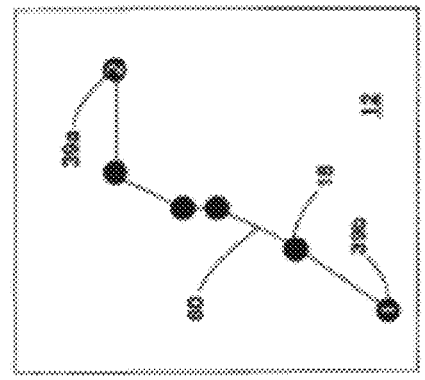

FIG. 10 illustrates an event path 60 generated by an event. The domain server 26 maintains a list of active visitors on the network 10 and the current location of each visitor in the universe. The map 12 displays the positions of all the users 39 and the path to each user. For clarity only two active visitors 39a, 39b and one path 60 between them are shown in FIG. 10. Paths 60 are automatically updated as visitors move about in the universe and as visitors join and leave the network.

A fourth type of path supported by the network is the visitor-defined path. Path 54 (see FIG. 5) represents a visitor-defined path. The visitor defines the end points and the points 18 of the path 54. The path can be created, for example, by inputting a list of the points 18 defining the path or by having the VR browser 14 maintain and store a history of the points 18 visited by the visitor in prior visits.

The definition of the visitor-defined path 54 may be stored on the visitor's machine 16 for use only by the visitor 39. Alternatively, the path definition is stored in the universe database 30 and made available to all network visitors.

As described above, the domain server 26 provides a single point of access for the VR browser 14 to initiate a user session and display a map of available points 18 in the universe. This enables new points 18 to be added to the universe and new virtual reality representations of new or existing points 18 to be made available to all VR browsers 14 on the network 10 by updating the domain server databases 30 and 32.

An author creating a virtual reality representation for a new or existing point 18 stores the data on his or her own VR data server 20 and then connects the VR data server to the network 10. The author remotely invokes an administrative program on the domain server 26 that adds the location to the universe database 30 and adds a new VRR record 34 to the network database 32. The new VRR record 34 includes the location of the new point 18 and the network address of the associated VR data server 20. The VR browser 14 automatically generates an up-to-date map 12 when it retrieves the map data from the universe database 30.

If desired, the client machine 16 can cache VR data 34 as well as records from the databases 30, 32, and 36 for improved performance. The VR browser 14 uses the local data cache to display the map and to retrieve VR data from the network 10. However, the data cache should be refreshed regularly or at the visitor's command to prevent stale data. Alternatively, the database records can include a "Time to Live" field for automatic updating of the data caches.

To facilitate creation of VR representations of points 18, the universe is preferably divided into a public region and a private region. Authors are free to add virtual reality representations of any point in the public region. Only authorized authors can add virtual representations of private regions.

To illustrate the concept of public and private regions in more concrete terms, the map 12 is a virtual representation of the Gettysburg National Military Park 62 and the adjacent borough of Gettysburg, Pa. 64. See FIG. 1; the borough of Gettysburg is represented schematically as a circular area. The Military Park 62 is a public region of the universe and the borough of Gettysburg 64 is a private region of the universe.

Tourists or Civil War buffs can author a virtual reality representation for a new point 18 in the Military Park 62 or author an additional virtual reality representation for an existing point 18. The author can provide visitor access to the representation through a publicly or privately available VR data server 20. The author updates the domain server databases 30, 32 through the administrative software as previously described and updates the local database 36 and stores the VR data 24 on the data server 20. The new point and its representation are now available to all visitors.

Over time, the number of points in the universe having virtual reality representations increases and the number of representations for a given point increases. This enables users to select points and view presentations that provide them with a rich and varied virtual visit to the virtual Military Park 62.

To further encourage the creation and selection of high-quality virtual presentations, each representation of a public point 18 is preferably assigned a quality moderation value. A quality moderation value represents the quality of the representation and assists visitors in selecting which representations to view. The quality moderation value is preferably stored in the representation's VRR record 34 (see FIG. 2) and is displayed on the map 12.

For example, a representation can be assigned a quality moderation value between 0 and 10, where 0 represents a low quality representation and 10 represent a high quality representation. A visitor can rate the quality of the representation after experiencing the virtual reality presentation. A running average of visitors' ratings is stored as the representation's quality moderation value. This mechanism enables the network 10 to be self-moderating in that representations whose quality falls below a minimum value can be automatically removed from the network or not listed for selection.

Virtual reality representations of points within Gettysburg borough 64, however, are limited to authorized authors. Examples of such authors may include owners of commercial establishments who wish to control the content of the virtual reality representation of their store or business. A private representation may be hosted on a VR data server 20 whose access is controlled by the author and may or may not be assigned a quality moderation value.

Virtual reality representations of public points are preferably created in a simple, standardized format to encourage those without technical or computer expertise to contribute virtual reality representations to the network 10.

Figure 11:
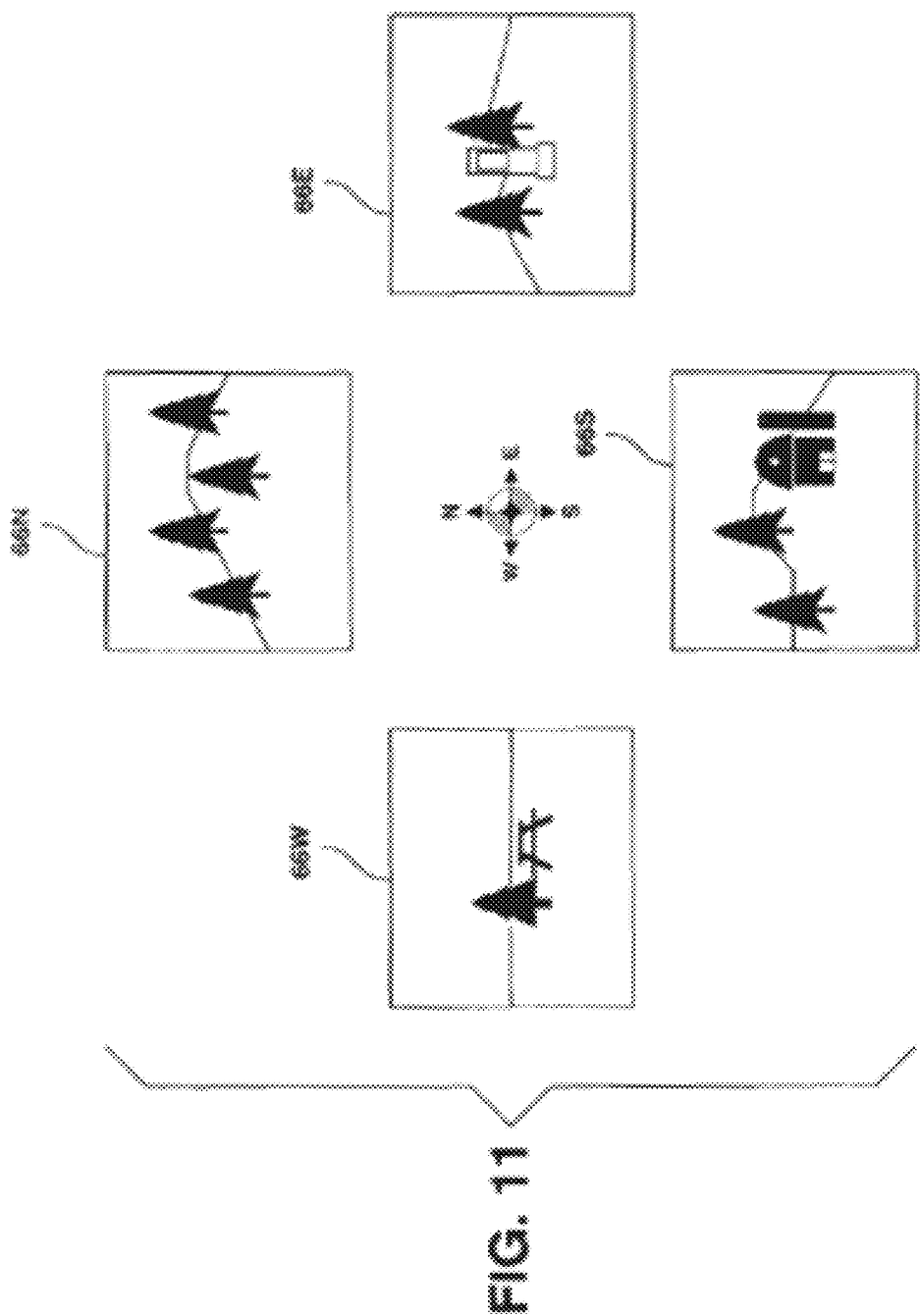
FIG. 11 represents photographs that define a simplified virtual reality representation of a physical location modeled in the virtual universe.

FIG. 11 illustrates a preferred, simplified virtual reality format. Four images 66 are taken with a digital camera from a point, each photograph having a line of view facing north, south, east, and west, respectively. The administrative program uploads the four image files and presents an on-line form requesting the location of the point and associated metadata. The administrative program stores the image files as VR data 24 on a VR data server 20, updates the universe database 30, adds the appropriate VRR record to the network database 32, and adds the appropriate VR record to the local database 36.

Because the illustrated public region 62 represents an area of the Earth, the latitude and longitude of the corresponding physical location of an actual point on the Earth's surface provides a convenient way of identifying the location of a point 18 on the map 12. The administrative program requests the latitude and longitude of the point, which can be obtained, for example, by a GPS reading when the digital photographs are taken.

It is understood that other kinds of metadata, data fields, data keys, or data formats can be used for or stored in the databases 30, 32, and 36 and that other VR data 24 can be stored in other file formats. The data can be distributed on other servers on the network 10. But the VR browser 14 preferably accesses the network 10 initially through the single domain server 26 regardless of how the data itself is distributed throughout the network 10.

It is contemplated that embodiments of the virtual reality network 10 will be customized for particular industries or visitors. For example, a real estate network would host virtual reality representations of houses available for sale. The seller's real estate agent takes photographs of each room in a house and uploads them to the real estate network, along with the floor plan and other metadata. A buyer's real estate agent selects the house to visit, and the VR browser displays the floor plan and the paths through the house. The visitor moves along the paths in the house, in effect taking a virtual reality tour through each room in the house.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What is claimed is:

1. A system for generating a virtual universe viewable by a user device, the system comprising:
   a plurality of data servers that store VR data sets of virtual representations of locations within a virtual universe for viewing on the user device, wherein each set of VR data is authored by a respective different author independently of other authors, and wherein the VR data sets include at least one VR data set associated with the time-sliced data indicating when the at least one VR data set was captured; and
   a domain server comprising:
      memory that maintains network addresses of each of the data servers and corresponding VR data sets of virtual representations of locations,
      a communication interface that receives a selection of a location in the virtual universe, wherein the selected location is received from the user device, and
      a processor that executes instructions stored in memory, wherein execution of the instructions by the processor:
         identifies one or more of the data servers that contains VR data related to the selected location and one or more additional locations adjacent to the selected location, wherein the identification is based on the network addresses stored in memory,
         retrieves the VR data related to the selected location and additional locations from the identified data servers,
         transfers the retrieved VR data from the identified data servers to the user device, wherein the user device generates a VR representation of the selected location, and wherein the user device further generates a VR presentation of one or more of the additional locations adjacent to the selected location upon request, and
         generates one or more paths connecting the selected location with the at least one of the additional locations, wherein the generated paths facilitates travel from the selected location to the at least one additional location without leaving the virtual universe, wherein the user device accesses a different VR data set by changing a time option associated with the VR representation of the selected location, and wherein the user device changes the time option by switching between real-time and time-sliced VR data sets.

2. The system of claim 1, wherein the VR data sets include an image captured by a web camera.

3. The system of claim 1, wherein the VR data sets include an image captured by an IP camera.

4. The system of claim 1, wherein the VR data sets include an image associated with the virtual representation of the location within the virtual universe, geographical data identifying where the image was taken, and a viewing direction associated with the image.

5. The system of claim 1, wherein the VR data sets include at least one of additional information about the location, descriptions of the VR representation, the author of the VR data set, or VR data set file format.

6. The system of claim 1, wherein the VR data related to the adjacent locations share a common orientation.

7. The system of claim 1, wherein the VR data related to the adjacent location share a common line of view.

8. The system of claim 1, wherein the processor further generates a display of a location of the user within the virtual universe.

9. The system of claim 1, wherein the processor further generates a display of a plurality of other users within the virtual universe.

10. The system of claim 1, wherein the processor further:
   receives user input regarding one or more paths between the user and one or more other users within the virtual universe;
   retrieves VR data sets associated with the one or more paths between a location of the user and a location of each of the one or more other users, wherein each location corresponds to a current location selection within the virtual universe; and
   generates one or more paths between the user and the one or more other users within the virtual universe, wherein the retrieved VR data sets associated with the one or more paths provide virtual representations of the paths for the user to view on the user device.

11. The system of claim 1, wherein the user device is a VR headset.

12. The method for generating a virtual universe viewable by a user device, the method comprising:
   storing VR data sets of virtual representations of locations within a virtual universe for viewing on the user device in a plurality of data servers, wherein each set of VR data is authored by a respective different author independently of other authors, and wherein the VR data sets include at least one VR data set associated with the time-sliced data indicating when the at least one VR data set was captured;
   maintaining addresses of each of the data servers and corresponding VR data sets of virtual representations of locations in memory;
   receiving a selection of a location in the virtual universe from a communication interface, wherein the selected location is received from the user device;
   identifying one or more of the data servers that contain VR data related to the selected location and one or more additional locations adjacent to the selected location, wherein the identification is based on the network addresses stored in memory;
   retrieving the VR data related to the selected location and additional locations from the identified data servers;
   transferring the retrieved VR data from the identified data servers to the user device, wherein the user device generates a VR representation of the selected location, and wherein the user device further generates a VR presentation of one or more of the additional locations adjacent to the selected location upon request; and
   generating one or more paths connecting the selected location with the at least one of the additional locations, wherein the generated paths facilitates travel from the selected location to the at least one additional location without leaving the virtual universe, wherein the user device accesses a different VR data set by changing a time option associated with the VR representation of the selected location, and wherein changing the time option comprises switching between real-time and time-sliced VR data sets.

13. The method of claim 12, wherein the VR data sets include an image captured via a web camera or IP camera.

14. The method of claim 12, wherein the VR data sets include an image associated with the virtual representation of the location within the virtual universe, geographical data identifying where the image was taken, and a viewing direction associated with the image.

15. The method of claim 12, wherein the VR data sets include at least one of additional information about the location, descriptions of the VR representation, the author of the VR data set, or VR data set file format.

16. The method of claim 12, wherein the VR data related to the adjacent location share a common orientation or a common line of view.

17. The method of claim 12, further comprising displaying a location of the user within the virtual universe.

18. The method of claim 12, further comprising displaying a plurality of other users within the virtual universe.

19. The method of claim 12, further comprising:
receiving user input regarding one or more paths between the user and one or more other users within the virtual universe,
retrieving VR data sets associated with the one or more paths between a location of the user and a location of each of the one or more other users, wherein each location corresponds to a current location selection within the virtual universe, and
generating one or more paths between the user and the one or more other users within the virtual universe, wherein the retrieved VR data sets associated with the one or more paths provide virtual representations of the paths for the user to view on the user device.

20. A non-transitory computer-readable storage medium, having embodied thereon a program executable by a processor to perform a method for generating a virtual universe viewable by a user device, the method comprising:
storing VR data sets of virtual representations of locations within a virtual universe for viewing on the user device in a plurality of data servers, wherein each set of VR data is authored by a respective different author independently of other authors, and wherein the VR data sets include at least one VR data set associated with the time-sliced data indicating when the at least one VR data set was captured;
maintaining addresses of each of the data servers and corresponding VR data sets of virtual representations of locations in memory;
receiving a selection of a location in the virtual universe from a communication interface, wherein the selected location is received from the user device;
identifying one or more of the data servers that contain VR data related to the selected location and one or more additional locations adjacent to the selected location, wherein the identification is based on the network addresses stored in memory;
retrieving the VR data related to the selected location and additional locations from the identified data servers;
transferring the retrieved VR data from the identified data servers to the user device, wherein the user device generates a VR representation of the selected location, and wherein the user device further generates a VR presentation of one or more of the additional locations adjacent to the selected location upon request, and
generating one or more paths connecting the selected location with the at least one of the additional locations, wherein the generated paths facilitates travel from the selected location to the at least one additional location without leaving the virtual universe, wherein the user device accesses a different VR data set by changing a time option associated with the VR representation of the selected location, and wherein changing the time option comprises switching between real-time and time-sliced VR data sets.

* * * * *